(No Model.) 2 Sheets—Sheet 1.

W. ROBINSON.
RAIL JOINT.

No. 574,942. Patented Jan. 12, 1897.

WITNESSES:     INVENTOR:
James H. Ripley     Wm. Robinson
J. A. Hayward (No Model.) 2 Sheets—Sheet 2.

W. ROBINSON.
RAIL JOINT.

No. 574,942. Patented Jan. 12, 1897.

WITNESSES: James W. Ripley. J. R. Hayward.

INVENTOR: Wm. Robinson.

UNITED STATES PATENT OFFICE.

WILLIAM ROBINSON, OF BOSTON, MASSACHUSETTS.

RAIL-JOINT.

SPECIFICATION forming part of Letters Patent No. 574,942, dated January 12, 1897.

Application filed November 14, 1894. Serial No. 528,715. (No model.)

*To all whom it may concern:*

Be it known that I, WILLIAM ROBINSON, a citizen of the United States, residing at Boston, in the county of Suffolk and State of Massachusetts, have invented a new and useful Improvement in Rail-Joints, of which the following is a specification.

This invention relates to improvements in the rail-joint shown and described in my application for a patent thereon filed October 7, 1893, Serial No. 487,530, and I do not therefore herein claim anything described and broadly claimed in the aforesaid application.

The nature of my invention will be understood from the description which follows, reference being had to the accompanying drawings, which form a part of this specification, in which—

Figure 1:
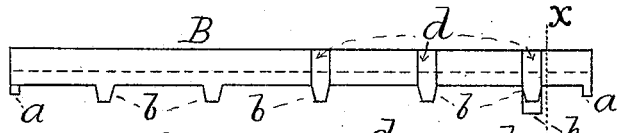
Figures 2, 3:
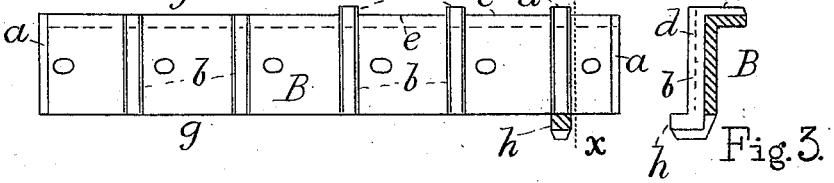
Figure 4:
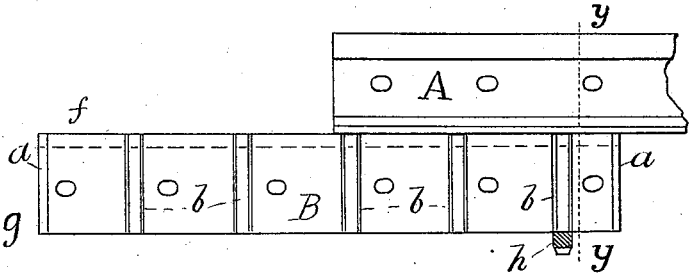
Figure 5:
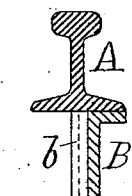
Figure 6:
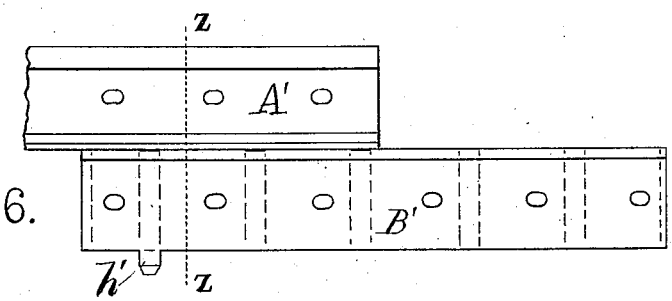
Figure 7:
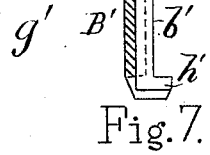
Figure 8:
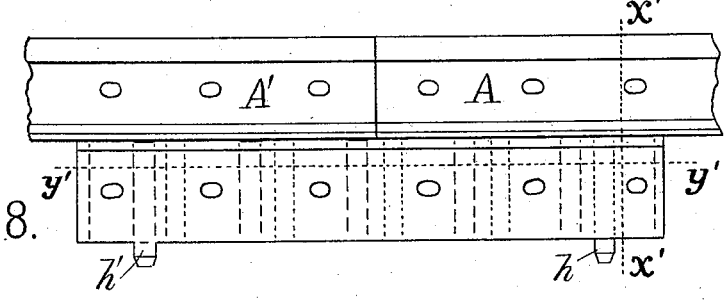
Figure 9:
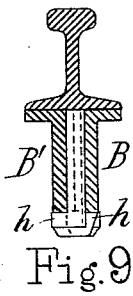
Figure 10:
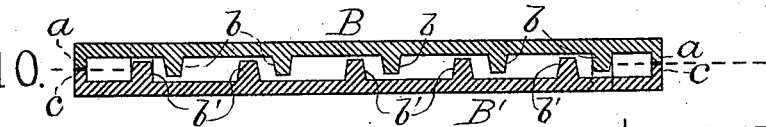
Figures 11, 12:
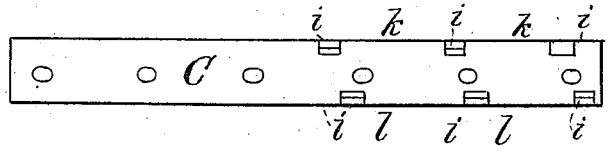
Figures 13, 14:
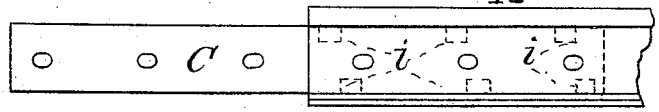
Figures 15, 16:
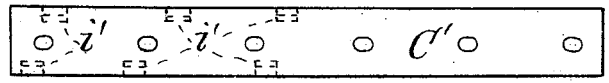
Figures 17, 18:
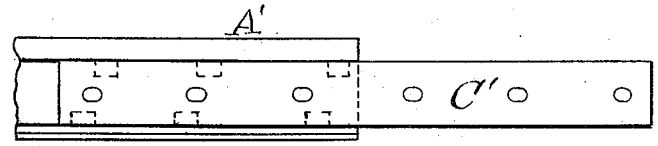
Figure 19:
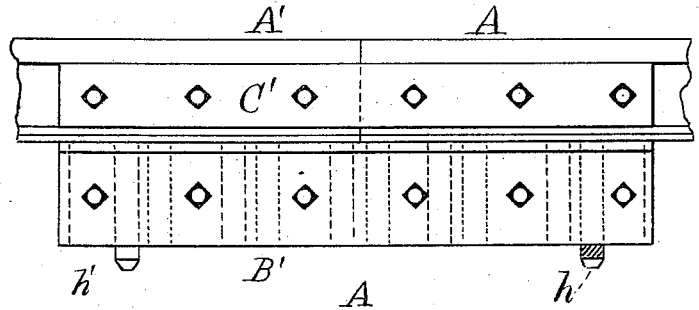
Figure 20:
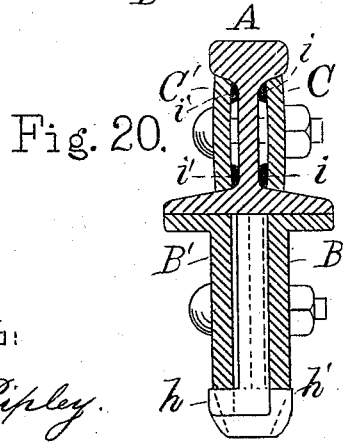

Figure 1 is a top view of a girder-plate, illustrating a part of my invention. Fig. 2 is a side view of the same; and Fig. 3, a cross-section through the lines $xx$, Figs. 1 and 2. Fig. 4 shows the end of a rail with the girder-plate secured thereto; and Fig. 5 is a cross-section through the line $y\,y$, Fig. 4. Fig. 6 is a duplication of Fig. 4 on the opposite end of the rail, or preferably for my purpose, as shown, on the end of the rail adjacent and corresponding to that shown in Fig. 4. Fig. 7 is a cross-section through the line $z\,z$, Fig. 6. Fig. 8 shows Figs. 4 and 6 combined and the invention thus more fully developed. Fig. 9 is a cross-section through the line $x'\,x'$, Fig. 8. Fig. 10 is a horizontal section through $y'\,y'$, Fig. 8. Fig. 11 shows the side splice-bar, and Fig. 12 a cross-section of the same. Fig. 13 shows the side splice-bar secured to the end of a rail, and Fig. 14 is a cross-section of the same. Fig. 15 shows a similar side splice-bar for the adjacent rail, and Fig. 16 a cross-section of the same. Fig. 17 shows said splice-bar and rail secured together, and Fig. 18 a cross-section of the same. Fig. 19 shows the rail-joint complete in elevation, and Fig. 20 is a cross-section of the same.

A is a railroad-rail, to the bottom of which the girder-plate B is rigidly secured, preferably by the electric welding process. The girder B, as shown in the drawings, has one half of its length projecting under and welded to the bottom of the rail A, the other half projecting beyond the end of said rail and under the adjacent rail for the purpose of supporting the latter.

The form of the girder-plate B is peculiar. By referring to Fig. 10 and some other figures it will be seen that the vertical web of the plate B is provided with inwardly-projecting vertical ribs or lugs $b$, while the corresponding plate B' is similarly provided with inwardly-projecting ribs or lugs $b'$. The dotted line passing longitudinally midway between the plates B B' coincides with the center line of the rail, as shown also in dotted lines in Figs. 5, 7, and 20.

The reason for making the girder-plate B in the form described is this: When two pieces of metal are electrically welded together, the molten metal flows so as to make a rough and enlarged joint, and when one piece of metal is thus welded to another in such a way as to form an angle between the two the angle is partly filled up and rounded out by the molten metal. If, therefore, the plates B B' were formed with a continuous smooth edge on their inner surface and were welded with this edge coinciding with the longitudinal center line of the rails, the molten metal would partly fill up the angle formed between the plates and the rails at the longitudinal center line of the latter. As a consequence the aforesaid plates B B' could not come close together because of the intervening overflowed metal, that is, the adjacent rails would be out of alinement. In the present instance, however, the girder-plates B and B' are located to one side of the center line of the rails, leaving a considerable open space between the main body or vertical webs of said plates. At the same time the projecting ribs $b\,b'$ extend under and even beyond the center line of said rails, whereby the adjacent rails are centrally supported by each of the plates B B'.

It will be observed that the ribs $b\,b'$ alternate with each other, but do not come close together; also, that there is space left between said ribs, respectively, and the webs of their opposite girder-plates. Thus the overflow of molten metal taking place in welding the plate B to the rail A will not interfere with the proper location and alinement of the plate B' when the adjacent rails are brought together, nor, on the other hand, will the overflow metal caused by welding the plate B' to the rail A' interfere with the proper position and alinement of the plate B under similar circumstances, since there is sufficient space left between said plates B B' to allow for the overflow metal without the latter interfering with the proper position of adjacent parts. The plates B B' are provided, respectively, also with the ribs or projections $a$ and $c$. When the adjacent rails are brought together, the ribs $a$ abut against the ribs $c$, thus fixing the proper alinement of the rails. These ribs $a$ and $c$ are not affected by the welding, since they are removed sufficiently far from the location of the welding not to be affected by it.

The upper surface of the plate B is provided with slight upward projections or contact-points $d$. These points are brought in contact with the bottom of the rail in proper position preparatory to welding. When the welding-current is turned on, it is localized at the points $d$, and only these points and the corresponding points of the rail are brought to a welding heat. As a consequence the weld is much more quickly made and with much less current than if the continuous upper surface of the plate B were brought in contact with the rail. This arrangement therefore is in the interest of economy and practicability. Perhaps a much more important consideration, however, is this: When the contact-points $d$ and the corresponding points of the bottom of the rail have reached a welding heat and the plate B and rail A are rigidly clamped together to produce the weld, the intervening parts $e$ of the upper surface of the plate B and the parts of the rail corresponding thereto have not been raised to a welding heat. Consequently when these parts come together the welding compression can force them no farther and therefore the parts $e$ and the normal bottom of the rail are retained in perfect alinement with the upper surface $f$ of the outer end $g$ of the plate B. Thus provision is made for keeping the lower and upper surfaces of the adjacent rails in perfect alinement.

It is to be observed that the contact projections $d$ are placed only on the inner or welding end of the plate B, the outer end $g$ of said plate being free from such projections.

The plate B is provided at or near its inner end and at the bottom with the inwardly-projecting lug or support $h$, and the plate B' is similarly provided with the supporting-lug $h'$ at its inner end.

Now when the rails A and A', with their respective plates B and B', are brought together in forming a joint, as shown in Figs. 8 and 9, the lug $h'$ of the plate B' supports the free or outer end of the plate B, and in like manner the lug $h$ of the plate B supports the free or outer end of the plate B'. Thus each rail is supported close to the junction of the two rails by the girder-plate welded to the bottom of the adjacent rail, and each rail, in addition, is supported, through the girder-plate welded thereto, by the lug at the extreme inner end of the girder-plate welded to the adjacent rail, that is, each rail is supported far beyond its outer end by the lug on the inner end of the girder-plate welded to the adjacent rail. This forms an interlocked or trussed joint which in itself gives an enormous support to the ends of both rails.

The bolt-holes in the plates B B', or some of them, are oblong in shape to allow for the proper expansion and contraction of the rails, and in forming the joint these plates are preferably securely bolted together, as shown in Figs. 19 and 20.

To further enhance the efficiency of the joint, the fish-plate C is welded to the side of the rail A, one end of said fish-plate being welded in the side groove of said rail and the other end projecting beyond the end of the rail, as shown in Figs. 13 and 14.

The fish-plate C is provided on its inner side with the projections $i$ near the upper and lower edges of said plate.

When the plate C is placed in the groove of the rail in position to be welded, these projections $i$ find a bearing against the rail adjacent to the upper and lower corners of the groove of the same. The projections $i$ are normally long enough to keep the main body of the plate C a short distance away from the rail. As soon, however, as the welding-current is turned on it quickly brings the projections $i$ and the parts of the rail touched by them to a welding heat. The clamp is now applied to press the plate C and rail together to complete the weld, as shown in Figs. 13 and 14.

It will be seen that the upper and lower edges $k$ $l$ of the plate C intervening between the projections $i$ are not brought to a welding heat, and consequently the pressure exerted in welding brings these edges up to a close-fitting position against the flange and head of the rail, as shown in Fig. 14, but does not interfere with the proper alinement of the edges of the plate C throughout any part of their entire length. As a consequence when the plate C is welded to one rail its outer or free end will fit exactly into the groove of the adjacent rail and the two rails will be in exact alinement.

It will be noted that if the whole surface of the upper and lower edges of the plate C in contact with the rail were brought to a welding heat the welding pressure on the plate C would be liable to press the welded end out of alinement with the free end, and consequently the adjacent rails when brought together would be out of alinement.

The construction shown in Figs. 15, 16, 17, and 18 is identical with that described in connection with Figs. 11, 12, 13, and 14, but applied to the adjacent rail. It is not necessary, therefore, to specifically describe these figures.

The completed joint is shown in Figs. 19 and 20, in which the rail A, provided with the welded plates B and C, and the rail A', provided with the welded plates B' and C', are brought together. The outer or free ends of the plates B and C overlap the rail A' and the free ends of the plates B' C' overlap the rail A.

Bolts passing through the plates B B' and through the plates C C' and the rail hold the parts firmly together, forming a perfectly-trussed joint, the rails in perfect alinement in all directions and with proper provision for the expansion and contraction of the rails.

The rails are supported on ties or in any usual or suitable manner not necessary to illustrate.

If desired, the upper and lower projections $i$ on the plate C might be joined together, forming a welding-rib across said plate, as shown in dotted line in Fig. 16, but I prefer the arrangement of small independent projections to facilitate rapidity of welding, economy of current, and in order to have several small welding-spots distributed over the rail rather than to have any single larger surface of the rail brought to a welding heat, since the latter would be liable to deteriorate the rail. For the same reason I prefer to put the upper and lower projections $i$ diagonally opposite each other, as shown, rather than directly opposite each other. By thus "staggering" the welding-points I avoid such weakening of the rail as might occur by having more than one small welding-point in the same vertical plane of the rail.

Having thus described my invention, what I claim as new, and desire to secure by Letters Patent, is—

1. In a rail-joint, a plate having one end permanently secured to the bottom of one rail, space being left being between said plate and the longitudinal center of said rail, the opposite end of said plate extending under and detachably supporting, the adjacent rail, substantially as described.

2. In a rail-joint, the combination, substantially as described, of two rails, each provided with a truss or plate having one end permanently secured to the bottom of said rail at one side of the longitudinal center of the same, and the opposite end extending under and supporting the adjacent rail, an open space being thus left between the inner vertical walls of said truss or bottom plates.

3. In a rail-joint, the combination, substantially as described, of the rail and a girder or truss plate having one end permanently secured to the bottom of said rail and the other end extending beyond the end of said rail and detachably supporting the adjacent rail, said plate being provided with ribs or projections extending inwardly toward or under the longitudinal center line of the rail and affording central support for the same.

4. In a rail-joint, the combination, substantially as described, of two rails, each provided with a truss or plate having one end permanently secured to the bottom of said rail at one side of the longitudinal center of the same, the other end of said plate extending beyond the end of said rail and forming a support for the adjacent rail, said plates being provided with vertical ribs or projections extending inwardly toward or under the center of the rails and arranged to afford central support for the same.

5. The girder-plates B B' adapted to be secured to the bottoms of adjacent rails, said plates being provided, respectively, with the inward projections $b\ b'$, said projections alternating with each other, substantially as described.

6. In a rail-joint, a splice-bar constructed for welded attachment to one only of the abutting rails, said bar being provided with a plurality of welding projections grouped nearer to one end of said bar than the other and adapted to form a plurality of welding connections with the same rail, substantially as described.

7. In a rail-joint, the truss or bottom plate B provided with the welding projections $d\ d$, with space between them, said projections being adapted to form several welding connections with the same rail, substantially as described.

8. In a rail-joint, a splice-bar constructed for welded attachment to one only of the abutting rails, said bar being provided with a plurality of welding projections grouped nearer to one end of said bar than the other, said projections forming a plurality of welding connections with the same rail, the portion of said splice-bar between said projections, and not raised to a welding heat, limiting the compression and regulating the predetermined relative position of said splice-bar and rail when welded together, substantially as described.

9. In a rail-joint, a splice-bar provided with a plurality of welding-points projecting from the surface of said bar and grouped nearer to one end of said bar than the other, portions of said bar being located between said welding projections and not raised to a welding heat, limiting the position of said bar and causing the same to fit the surface or groove of the rail in a predetermined manner, whereby said splice-bar, when welded to the rail, will be in proper and exact alinement relatively to the rail or rails, substantially as described.

10. A splice-bar provided with welding-points projecting from its surface, said welding-points being located at intervals diagonally opposite to each other, substantially as described.

11. A rail-joint consisting, essentially, of the following elements in combination: two abutting rails, each provided with a truss-plate having one end permanently secured to the bottom of said rail and the opposite end extending under and supporting the other rail, space being left between the inner vertical sides of said plates, said girder-plates interlocking and detachably supporting each other, fish-plates on opposite sides of said rails and bolts passing through said fish-plates and rails.

12. A rail-joint consisting, essentially, of the following elements in combination: two abutting rails, each provided with a truss-plate having one end permanently secured to the bottom of said rail and the opposite end extending under and supporting the other rail, space being left between the inner vertical sides of said plates, said girder-plates interlocking and supporting each other, and two fish-plates, each rail being provided with one having one end permanently secured to the side of said rail and the other end overlapping the abutting rail, said rails being detachably secured together.

WILLIAM ROBINSON.

Witnesses:
JAS. W. RIPLEY,
CHAUNCY C. ALLEN.